United States Patent
Sakuma et al.

(10) Patent No.: US 7,397,221 B2
(45) Date of Patent: Jul. 8, 2008

(54) BATTERY PROTECTION DEVICE, BATTERY PROTECTION SYSTEM USING THE SAME, AND BATTERY PROTECTION METHOD

(75) Inventors: Katsuya Sakuma, Atsugi (JP); Shuhei Abe, Atsugi (JP); Kazuhiro Ooshita, Atsugi (JP); Yukihiro Terada, Atsugi (JP)

(73) Assignee: Mitsemi Electric Co., Ltd., Tokyo (JP)

( * ) Notice: Subject to any disclaimer, the term of this patent is extended or adjusted under 35 U.S.C. 154(b) by 305 days.

(21) Appl. No.: 11/046,492

(22) Filed: Jan. 28, 2005

(65) Prior Publication Data

US 2005/0242780 A1 Nov. 3, 2005

(30) Foreign Application Priority Data

Apr. 28, 2004 (JP) ............................. 2004-134319

(51) Int. Cl.
*H02J 7/00* (2006.01)
*H02J 7/04* (2006.01)
*H02J 7/16* (2006.01)
*G01N 27/42* (2006.01)
*G01N 27/416* (2006.01)
*H02H 7/18* (2006.01)

(52) U.S. Cl. .................. 320/134; 320/116; 320/136; 320/152; 324/425; 324/434; 307/10.7

(58) Field of Classification Search ............... 320/116, 320/134, 136, 152; 324/425, 434; 307/10.7
See application file for complete search history.

(56) References Cited

U.S. PATENT DOCUMENTS

| | | | | |
|---|---|---|---|---|
| 6,118,255 A * | 9/2000 | Nagai et al. | ................. | 320/152 |
| 6,320,242 B1 * | 11/2001 | Takasu et al. | ............... | 257/529 |
| 6,762,588 B2 * | 7/2004 | Miyazaki et al. | ............ | 320/116 |
| 2004/0119444 A1 * | 6/2004 | Faure et al. | ................. | 320/134 |

FOREIGN PATENT DOCUMENTS

| | | | |
|---|---|---|---|
| JP | 2001-307782 | * | 2/2001 |
| JP | 2001-307782 | | 11/2001 |
| JP | 2001307782 A | * | 11/2001 |
| JP | 2003208927 A | * | 7/2003 |
| JP | 2005117780 | | 4/2005 |

* cited by examiner

*Primary Examiner*—Akm Enayet Ullah
*Assistant Examiner*—Johali A Torres
(74) *Attorney, Agent, or Firm*—Ladas & Parry LLP

(57) ABSTRACT

A battery protection device protects a battery from an abnormal state. The battery protection device includes a detector that detects an abnormality of the battery and outputs an abnormality detection signal when the abnormality is detected. A current is input to an input terminal from outside. A voltage converter converts the current input to the input terminal to voltage and outputs the voltage. A combiner combines the abnormality detection signal with the voltage and outputs a combined signal. A current converter converts the combined signal to a current. An output terminal outputs the current.

5 Claims, 6 Drawing Sheets

BATTERY PROTECTION DEVICE, BATTERY PROTECTION SYSTEM USING THE SAME, AND BATTERY PROTECTION METHOD

BACKGROUND OF THE INVENTION

1. Field of the Invention

The present invention generally relates to battery protection devices, battery protection systems using the battery protection devices, and battery protection methods, and more particularly, to a battery protection device, a battery protection system, and a battery protection method that detect overcharge and over-discharge of a battery and control a switching element.

2. Description of the Related Art

In terms of its energy density and charging/discharging characteristics, lithium ion batteries have been attracting attention as secondary batteries that are repeatedly used by being charged. However, since the characteristics of lithium ion batteries are apt to be degraded due to over-discharging and overcharging, it has been necessary to protect lithium ion batteries with battery protection systems.

FIG. 1 is a circuit diagram of a conventional battery protection system 1.

In the case where n batteries 11 are connected in series in the conventional battery protection system 1, both ends of each of the n batteries 11 are connected to corresponding terminals T11 through Tn+1, thereby monitoring the n batteries 11 with a protection IC 12. When the protection IC 12 detects an over-discharged state or overcharged state of the n batteries 11, terminals T21 and T22 supply abnormality detection signals to driver circuits 13 and 14, respectively. The driver circuits 13 and 14 control the gate voltages of MOS transistors M1 and M2 in accordance with the abnormality detection signals from the terminals T21 and T22 of the protection IC 12, thereby turning OFF the MOS transistors M1 and M2, respectively. The drains and sources of the MOS transistors M1 and M2 are connected in series between the batteries 11 and a terminal T1. When the MOS transistors M1 and M2 are turned OFF, the batteries 1 and the terminal T1 are disconnected, and discharging or charging is stopped. In the aforementioned manner, the batteries 11 are protected from discharging and overcharging.

In the battery protection system 1 as shown in FIG. 1, it is necessary for the single protection IC 12 to protect the batteries connected in series. Thus, when the number of batteries is increased, a high voltage is applied to the protection IC 12, and the protection IC 12 may not be able to withstand the high voltage. Hence, it has been possible to protect merely several batteries connected in series. Accordingly, there is a demand for a battery protection system capable of protecting a large number of batteries connected in series.

As for battery protection systems capable of protecting a large number of batteries connected in series, there has been proposed a system for protecting batteries by performing abnormality detection by: dividing portions to be detected into blocks for each battery; sequentially transmitting abnormality detection information from a high-voltage side to a low-voltage side; and turning OFF a switching element connected in series to the batteries in response to the abnormality detection information output from the last block (refer to, for example, Japanese Laid-Open Patent Application No. 2001-307782).

However, since conventional battery management systems perform level shifting by detecting the voltages of the adjacent protection blocks, there have been problems in that it is difficult or impossible to separately drive blocks and that wiring becomes complex.

Additionally, it has been necessary in conventional battery management systems to connect plural protection blocks in a predetermined order.

SUMMARY OF THE INVENTION

A general object of the present invention is to provide an improved and useful battery protection device, battery protection system, and battery protection method in which one or more of the above-mentioned problems are eliminated.

Another and more specific object of the present invention is to provide a battery protection device, a battery protection system, and a battery protection method that can separately detect the state of each battery with a simple circuit configuration.

In order to achieve the above-mentioned objects, according to one aspect of the present invention, there is provided a battery protection system (100) for protecting a plurality of batteries (111-1 through 111-n) connected in series from an abnormal state, the battery protection system comprising:

a switching element (M1, M2) connected to the batteries (111-1 through 111-n) in series;

a plurality of battery protection devices (113-1 through 113-n) that are provided for the batteries (111-1 through 111-n) in a corresponding manner, detect an abnormal state of the corresponding batteries (111-1 through 111-n), and output an abnormality detection signal; and a drive circuit (114, 115) that drives the switching element (M1, M2) in accordance with the abnormality detection signal, each of the battery protection devices (113-1 through 113-n) comprising:

a detector (211, R21, R22, 231, 232) that detects an abnormality of a corresponding one of the batteries (111-1 through 111-n) and outputs the abnormality detection signal when the abnormality is detected;

an input terminal (T15, T16) to which a current is input from outside;

a voltage converter (233) that converts the current input to the input terminal (T15, T16) to voltage and outputs the voltage;

a combiner (M11 through M17, 234) that combines the abnormality detection signal with the voltage and outputs a combined signal;

a current converter (M18, M19) that converts the combined signal to a current; and an output terminal (T13, T14) that outputs the current, wherein the battery protection devices (113-1 through 113-n) are connected to each other such that the output terminal (T13, T14) of one of the battery protection devices (113-(i-1)) is connected to the input terminal (T15, T16) of a subsequent one of the battery protection devices (113-i), and the output terminal (T13, T14) of one of the battery protection devices of a last stage (113-n) is connected to the drive circuit (114, 115).

Additionally, each of the battery protection devices (113-1 through 113-n) may be formed by a semiconductor integrated circuit chip.

It should be noted that the above reference numerals in parentheses are merely examples, and not intended to limit the scope of the claims.

In an embodiment of the present invention, plural battery protection devices are provided for plural batteries connected in series in a corresponding manner. The battery protection devices are connected to each other such that the output terminal of one of the battery protection devices is connected to the input terminal of a subsequent one of the battery protection devices in a sequential manner. The output terminal of the battery protection device of the last stage is connected to a drive circuit, which perform switching of a switching element. Accordingly, it is possible to separately detect the state of each of the batteries and to protect plural batteries with a simple circuit configuration.

Other objects, features and advantages of the present invention will become more apparent from the following detailed description when read in conjunction with the following drawings.

DETAILED DESCRIPTION OF THE PREFERRED EMBODIMENTS (System Structure)

Figure 1:
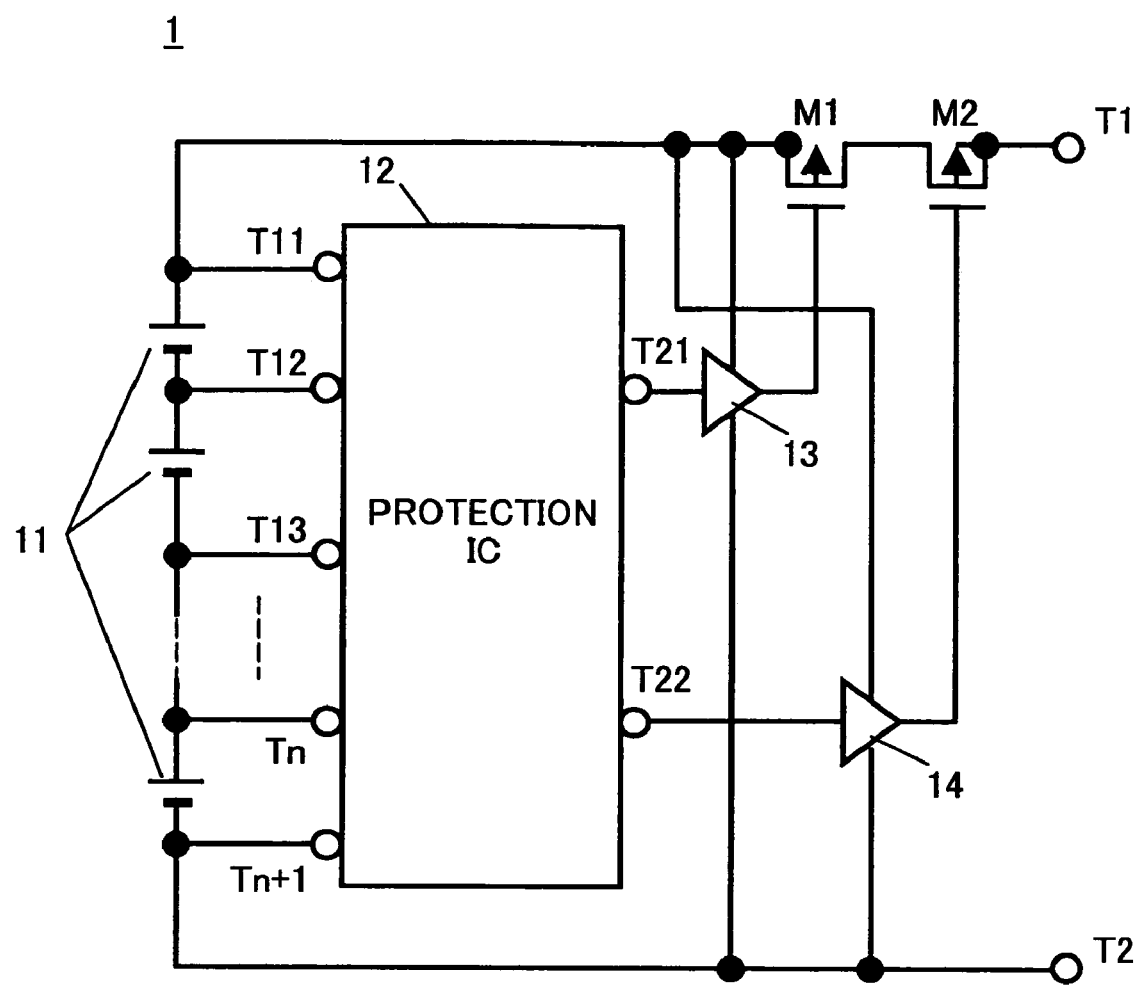
FIG. 1 is a circuit diagram of a conventional battery protection system.
Figure 2:
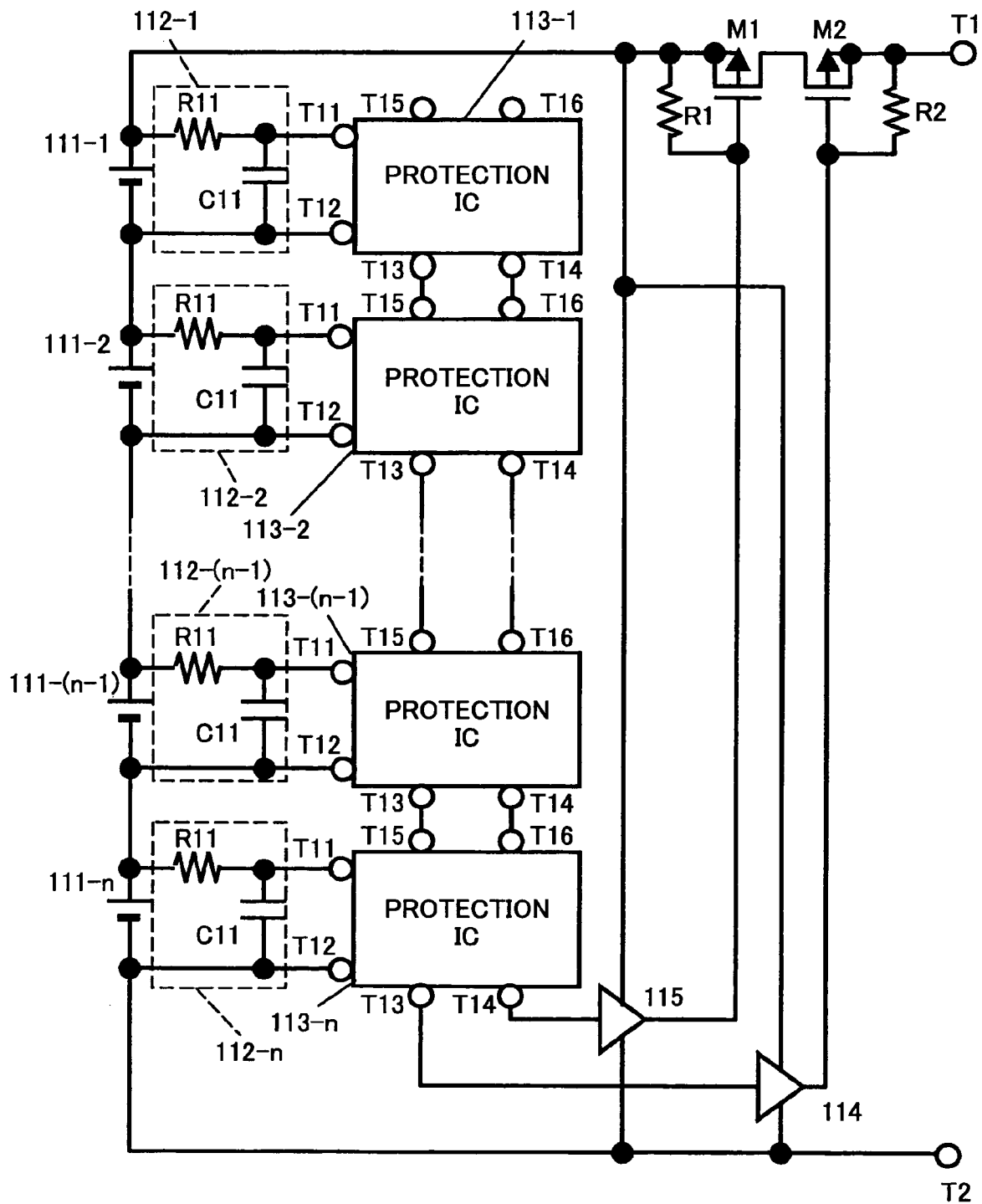
FIG. 2 is a system block diagram of a battery protection system according to one embodiment of the present invention.

FIG. 2 is a system circuit diagram of a battery protection system 100 according to one embodiment of the present invention.

The battery protection system 100 includes n batteries 111-1 through 111-n, MOS transistors M1 and M2, resistances R1 and R2, filter circuits 112-1 through 112-n, protection ICs 113-1 through 113-n, and drive circuits 114 and 115.

The n batteries 111-1 through 111-n are connected in series. One end of the n serially connected batteries 111-1 through 111-n is connected to a terminal T1 via MOS transistors M1 and M2 whose sources and drains are connected in series. The other end of the n serially connected batteries 111-1 through 111-n is connected to a terminal T2.

The filter circuits 112-1 through 112-n and the protection ICs 113-1 through 113-n are provided to correspond to the batteries 111-1 through 111-n, respectively.

Hereinafter, it is assumed that a filter circuit 112-$i$ represents one of the filter circuits 112-1 through 112-n. In addition, it is assumed that a battery 111-$i$ represents one of the batteries 111-1 through 111-n. Further, it is assumed that a protection IC 113-$i$ represents one of the protection circuits 113-1 through 113-n.

(Filter Circuits 112-$i$)

The filter circuit 112-$i$ includes a resistance R11 and a capacitor C11. The filter circuit 112-$i$ is connected to both ends of the battery 111-$i$ and removes a noise component of voltage produced across the battery 111-$i$.

(Protection IC 113-$i$)

Figure 3:
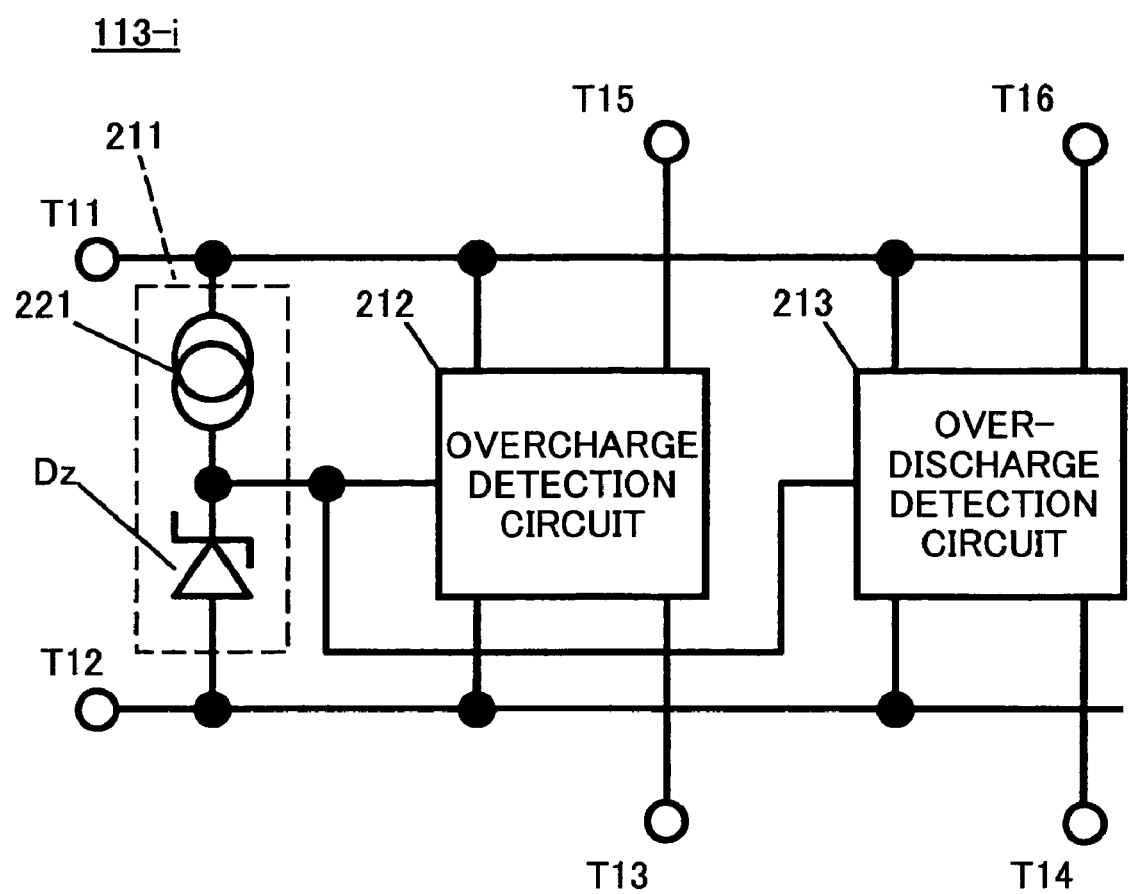
FIG. 3 is a circuit diagram of a protection IC.

FIG. 3 is a circuit diagram of the protection IC 113-$i$.

The protection IC 113-$i$ is formed by a semiconductor IC chip. The protection IC 113-$i$ is a circuit that detects over-charge and over-discharge of the battery 111-$i$ and controls the MOS transistors M1 and M2. The protection IC 113-$i$ includes a reference voltage generation circuit 211, an overcharge detection circuit 212, and an over-discharge detection circuit 213. The voltage from which the noise component is removed by the filter circuit 112-$i$ is applied from the battery 111-$i$ to terminals T11 and T12 of the protection IC 113-$i$.

(Reference Voltage Generation Circuit 211)

The reference voltage generation circuit 211 includes a current source 221 and a constant voltage diode Dz. The reference voltage generation circuit 211 is connected between the terminals T11 and T12, and generates a reference voltage Vref from the voltage across the battery 111-$i$. The reference voltage Vref generated in the reference voltage generation circuit 211 is supplied to an overcharge detection circuit 212 and an over-discharged detection circuit 213.

(Overcharge Detection Circuit 212)

Figure 4:
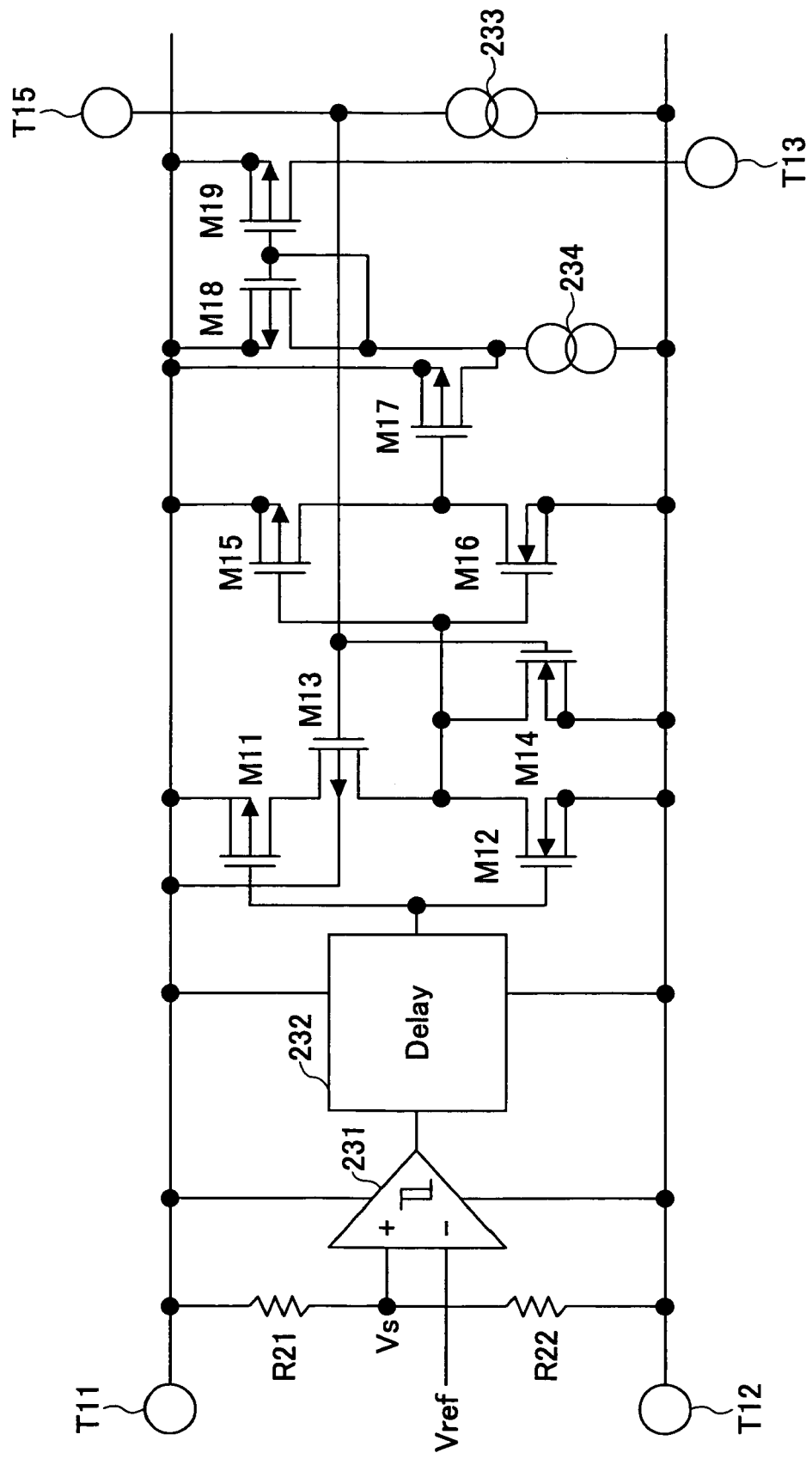
FIG. 4 is a circuit diagram of an overcharge detection circuit.

FIG. 4 is a circuit diagram of the overcharge detection circuit 212.

The overcharge detection circuit 212 includes a comparator 231, a delay circuit 232, current sources 233 and 234, resistances R21 and R22, and MOS transistors M11 through M19.

The resistances R21 and R22 are connected in series between the terminals T11 and T12, divide the voltage applied between the terminals T11 and T12, and constitute a dividing circuit for generating a detection voltage Vs. The detection voltage Vs is output from the connection point between the resistances R21 and R22, and is applied to a noninverting input terminal of the comparator 231. The reference voltage Vref is applied from the reference voltage generation circuit 212 to an inverting input terminal of the comparator 231.

The comparator 231 is formed by a hysteresis comparator. When the detection voltage Vs becomes adequately higher than the reference voltage Vref, the output of the comparator 231 becomes high level. When the detection voltage Vs becomes adequately lower than the reference voltage Vref, the output of the comparator 231 becomes low level.

The output of the comparator 231 is supplied to the delay circuit 232. The delay circuit 232 delays and outputs the supplied output of the comparator 231.

A terminal T15 is connected to the terminal T12 via the current source 233. A current is supplied to the terminal T15 from outside. When the current supplied to the terminal T15 is large, the potential of the connection point between the terminal T15 and the current source 233 becomes high level. When the current supplied to the terminal T15 is small, the potential of the connection point between the terminal T15 and the current source 233 becomes low level.

The MOS transistors M11 through M14 constitute a NOR gate, and output NOR logic between the output of the delay circuit 232 and the potential of the connection point between the terminal T15 and the current source 233. In addition, the MOS transistors M15 and M16 constitute an inverter that inverts the output of the NOR gate constituted by the MOS transistors M11 through M14. Further, the MOS transistor M17 and the current source 234 constitute an output circuit, and serve as an output stage of the inverter constituted by the MOS transistors M15 and M16.

Additionally, the MOS transistors M18 and M19 constitute a current mirror circuit, and return and output from the terminal T13 the output of the output circuit constituted by the MOS transistor M17 and the current source 234.

Next, a description is given of an operation of the overcharge detection circuit 212.

When the battery 111-i is overcharged and the detection voltage Vs becomes higher than the reference voltage Vref, the output of the comparator 231 becomes high level. When the output of the comparator 231 becomes high level, the output of the delay circuit 232 becomes high level after being delayed by the delay circuit 232 for a predetermined time interval.

When the output of the delay circuit 232 becomes high level, the output of the NOR gate constituted by the MOS transistors M11 through M14 becomes low level, irrespective of the state of the terminal T15. When the output of the NOR gate constituted by the MOS transistors M11 through M14 becomes low level, the output of the inverter constituted by the MOS transistors M15 and M16 becomes high level.

When the output of the inverter constituted by the MOS transistors M15 and M16 becomes high level, the MOS transistor M17, constituting the output circuit together with the current source 234, is turned OFF, and current is drawn from the current mirror circuit constituted by the MOS transistors M18 and M19. Thereby, a current is output to outside from the terminal T13.

In the aforementioned manner, it is possible to detect the overcharged state of the battery 111-i connected between the terminals T11 and T12, and to reflect the detected overcharged state to the terminal T13.

In addition, when current is supplied to the terminal T15 from outside, the potential of the connection point between the terminal T15 and the current source 233 becomes high level. When the potential of the connection point between the terminal T15 and the current source 233 becomes high level, the output of the NOR gate, which is constituted by the MOS transistors M11 through M14, becomes low level, irrespective of the output of the delay circuit 232. When the output of the NOR gate constituted by the MOS transistors M11 through M14 becomes low level, the output of the inverter constituted by the MOS transistors M15 and M16 becomes high level.

When the output of the inverter constituted by the MOS transistors M15 and M16 becomes high level, the MOS transistor M17, constituting the output circuit together with the current source 234, is turned OFF, and current is drawn from the current mirror circuit constituted by the MOS transistors M18 and M19. Thereby, current is output to outside from the terminal T13.

In the aforementioned manner, it is possible to reflect the state of the terminal T15 to the terminal T13.

(Over-discharge Detection Circuit 213)

Next, a description is given of the over-discharge discharge detection circuit 213.

Figure 5:
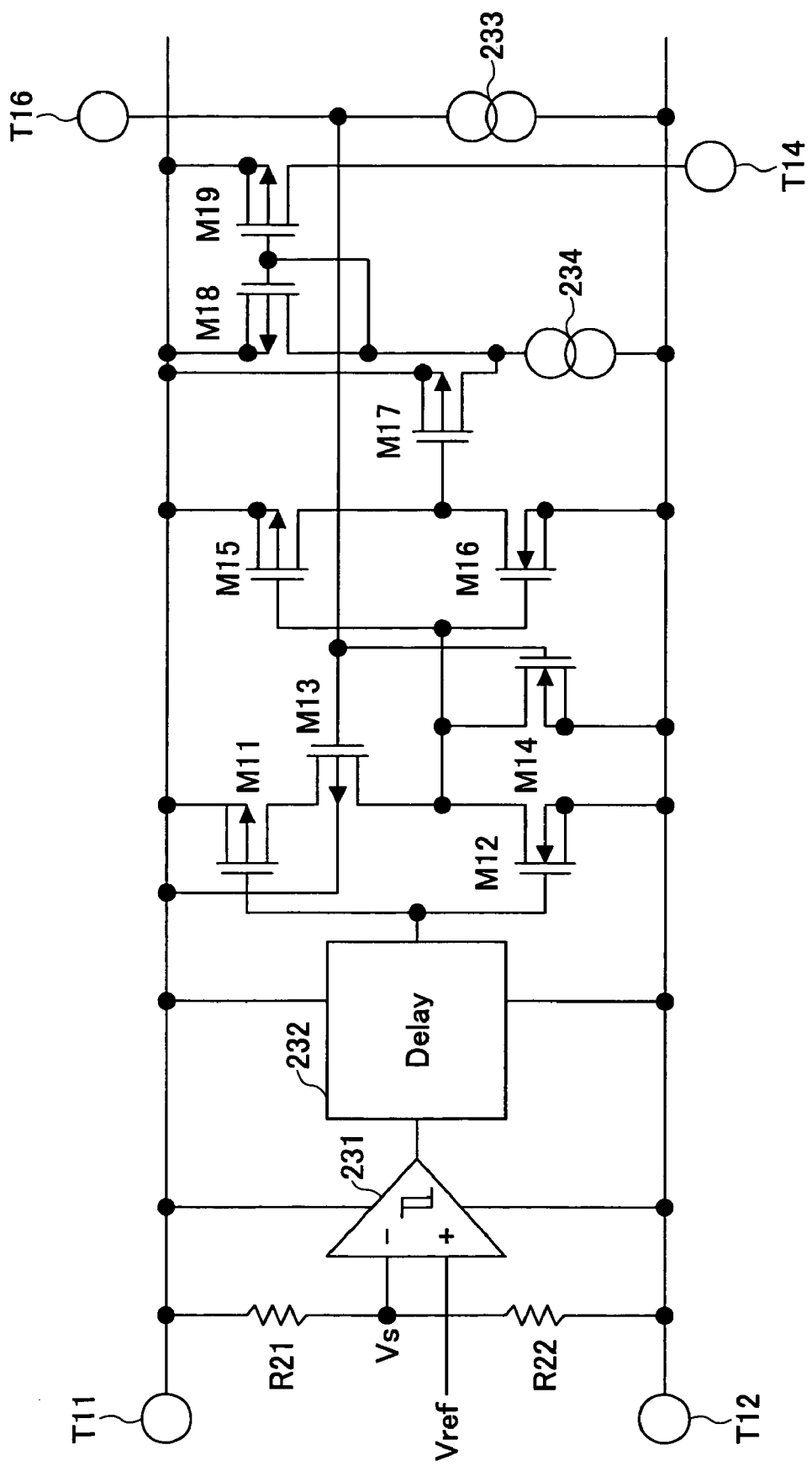
FIG. 5 is a circuit diagram of an over-discharge detection circuit.

FIG. 5 is a circuit diagram of the over-discharge detection circuit 213. In FIG. 5, those parts that are the same as those corresponding parts in FIG. 4 are designated by the same reference numerals, and a description thereof is omitted.

The configuration of the over-discharge detection circuit 213 is substantially the same as that of the overcharge detection circuit 212 shown in FIG. 4. The over-discharge detection circuit 213 has a structure obtained by, in the overcharge detection circuit 212 shown in FIG. 4, connecting the connection point between the resistances R21 and R22 to the inverting input terminal of the comparator 231, and applying the reference voltage generated in the reference voltage generation circuit 211 to the non-inverting input terminal of the comparator 231.

Here, a description is given below of an operation of the over-discharge detection circuit 213.

When the battery 111-i is over-discharged and the detection voltage Vs becomes lower than the reference voltage Vref, the output of the comparator 231 becomes high level. When the output of the comparator 231 becomes high level, the output of the delay circuit 232 becomes high level after being delayed by the delay circuit 232 for a predetermined time interval.

When the output of the delay circuit 232 becomes high level, the output of the NOR gate, which is constituted by the MOS transistors M11 through M14, becomes low level, irrespective of the state of a terminal T16. When the output of the NOR gate constituted by the MOS transistors M11 through M14 becomes low level, the output of the inverter constituted by the MOS transistors M15 and M16 becomes high level.

When the output of the inverter constituted by the MOS transistors M15 and M16 becomes high level, the MOS transistor M17, constituting the output circuit together with the current source 234, is turned OFF, and current is drawn from the current mirror circuit constituted by the MOS transistors M18 and M19. Thereby, current is output to outside from a terminal T14.

In the aforementioned manner, it is possible to detect the over-discharged state of the battery 111-i connected between the terminals T11 and T12, and to reflect the detected over-discharged state to the terminal T14.

When current is supplied to the terminal T16 from outside, the potential of the connection point between the terminal T16 and the current source 233 becomes high level. When the potential of the connection point between the terminal T16 and the current source 233 becomes high level, the output of the NOR gate, which is constituted by the MOS transistors M11 through M14, becomes low level, irrespective of the output of the delay circuit 232. When the output of the NOR gate constituted by the MOS transistors M11 through M14 becomes low level, the output of the inverter constituted by the MOS transistors M15 and M16 becomes high level.

When the output of the inverter constituted by the MOS transistors M15 and M16 becomes high level, the MOS transistor M17, constituting the output circuit together with the current source 234, is turned OFF, and current is drawn from the current mirror circuit constituted by the MOS transistors M18 and M19. Thereby, current is output to outside from the terminal T14.

In the aforementioned manner, it is possible to reflect the state of the terminal T16 to the terminal T14.

When the battery 111-i is overcharged or when current is supplied to the terminal T15 from outside, current is output from the terminal T13 of the protection IC 113-i. On the other hand, when the battery 111-i is over-discharged or current is supplied to the terminal T16 from outside, current is output from the terminal T14 of the protection IC 113-i.

On this occasion, the protection IC 113-i is driven only by voltage applied to the terminals T11 and T12 from the battery 111-i. Hence, it is only needed that the protection IC 113-i withstands as much voltage as is applied from a single battery 111-i.

The protection ICs 113-1 through 113-n are configured such that the terminal T13 of a protection IC 113-(i−1), which is a previous stage, is connected to the terminal T15 of a protection IC 113-i, which is the subsequent stage. The terminal T14 of the protection IC 113-(i−1), which is the previous stage, is connected to the terminal T16 of the protection IC 113-$i$, which is the subsequent stage.

Further, the terminals T15 and T16 of the protection IC 113-1, which is the first stage, are opened. The terminal T13 of the protection IC 113-$n$, which is the last stage, is connected to the drive circuit 114. The terminal T14 of the protection IC 113-$n$, which is the last stage, is connected to the drive circuit 115.

Figure 6:
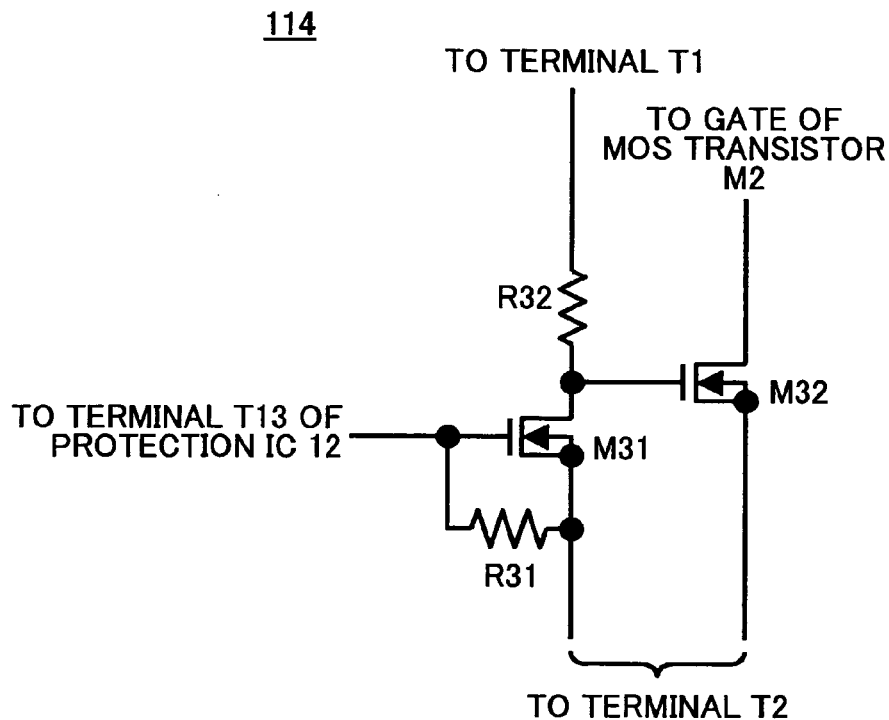
FIG. 6 is a circuit diagram of a drive circuit.

FIG. 6 is a circuit diagram of the drive circuit 114.

The drive circuit 114 includes n-channel MOS transistors M31 and M32 and resistances R31 and R32. The drain of the n-channel MOS transistor M31 is connected to the terminal T1 via the resistance R32, the source thereof is connected to the terminal T2, and the gate thereof is connected to the terminal T13 of the protection IC 113-$n$, which is the last stage. The resistance R31 is connected between the gate of the n-channel MOS transistor M31 and the terminal T2. The source and drain of the n-channel MOS transistor M32 are connected between the gate of the MOS transistor M2 and the terminal T2, and the gate thereof is connected to the connection point between the resistance R32 and the drain of the MOS transistor M31.

In the drive circuit 114, when at least one battery 111-$i$ of the batteries 111-1 through 111-n is overcharged and current is output from the terminal T13 of the protection IC 113-$n$, which is the last stage, current flows to the resistance R31 and the gate of the MOS transistor M31 becomes high level. When the gate of the MOS transistor M31 becomes high level, the MOS transistor M31 is turned ON. When the MOS transistor M31 is turned ON, the gate of the MOS transistor M32 becomes low level.

When the gate of the MOS transistor M32 becomes low level, the MOS transistor M32 is turned OFF. When the MOS transistor M32 is turned OFF, the drain potential of the MOS transistor M32 becomes high level. Thereby, the gate of the MOS transistor M2 becomes high level. Since the MOS transistor M2 is a p-channel MOS transistor, when the gate becomes high level, the MOS transistor M2 is turned OFF, and connection between the terminal T11 and the battery 111-1 is disconnected. Thereby, charging of the batteries 111-1 through 111-$i$ is stopped.

Since the configuration of the drive circuit 115 is the same as that of the drive circuit 114 shown in FIG. 6, a description thereof is omitted. When current is supplied from the terminal T14 of the protection IC 113-$n$, which is the last stage, that is, over-discharge occurs, the drive circuit 115 turns OFF the MOS transistor M1. Thereby, discharging of the batteries 111-1 through 111-n is stopped.

Additionally, in this embodiment, the description has been given of the configuration in which the protection ICs 113-1 through 113-$n$ are sequentially connected to each other such that the terminals T13 and T14 of a previous stage are connected to the terminals T15 and T16 of the subsequent stage, respectively, in order to protect the directly connected batteries 111-1 through 111-n. However, the protection IC according to this embodiment may be used independently.

Figure 7:
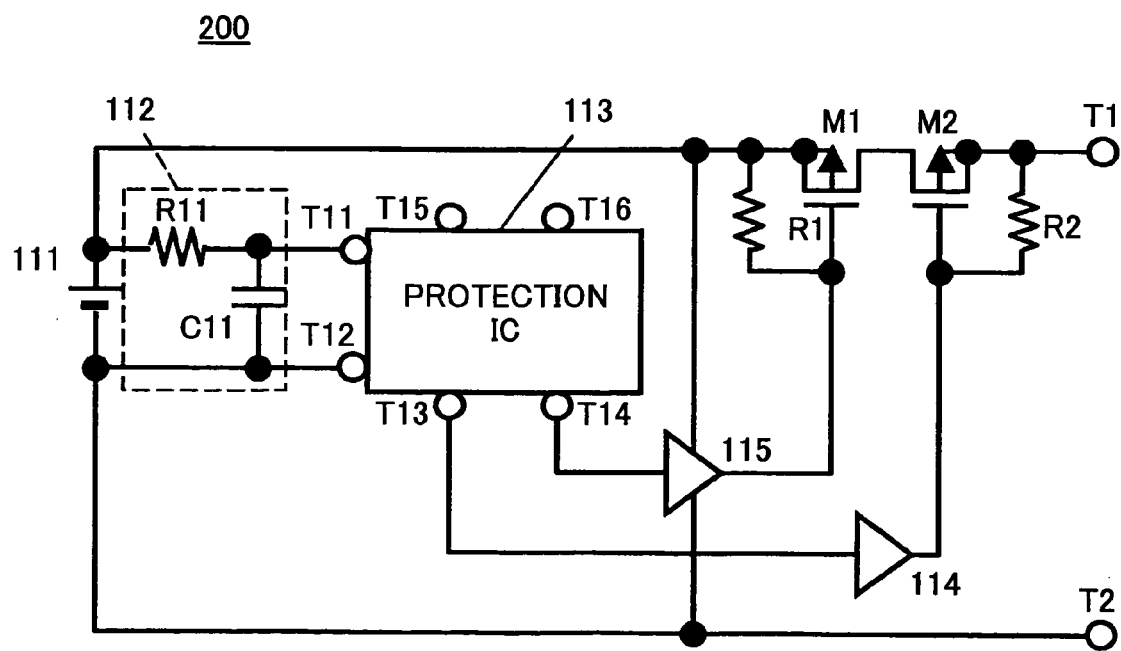
FIG. 7 is a circuit diagram of a battery protection system according to a variation of the embodiment.

FIG. 7 is a circuit diagram of a battery protection system 200 according to a variation of the above-mentioned embodiment. Here, it is assumed that the protection IC is used independently. In FIG. 7, those parts that are the same as those corresponding parts in FIG. 2 are designated by the same reference numerals, and a description thereof is omitted.

The battery protection system 200 is a system for protecting a single battery 111 with a protection IC 113. The terminals T11 and T12 of the protection IC 113 are connected to respective ends of the battery 111 via a filter circuit 112. In addition, the terminal T13 of the protection IC 113 is connected to the MOS transistor M2 via the drive circuit 114, and the terminal T14 of the protection IC 113 is connected to the MOS transistor M1 via the drive circuit 115. Further, the terminals T15 and T16 of the protection IC 113 are opened.

The protection IC 113 detects the voltage between the terminals T11 and T12 so as to detect an overcharged state or over-discharging state of the battery 111, and controls the MOS transistors M1 and M2, thereby protecting the battery 111 from overcharge and over-discharge.

As mentioned above, according to this variation, it is possible to use the protection IC 113 for protecting the single battery 111.

In the above-mentioned embodiment, the description has been given of the case where the protection IC includes the overcharge detection circuit and the over-discharge detection circuit. However, the circuit shown in FIG. 3 may further include an over-current detection circuit.

Additionally, in the above-mentioned embodiment, the terminals T13 and T14 of the protection IC 113-(i−1), which is for protecting a battery 111-(i−1) arranged at a position of a higher potential, are connected to the terminals T15 and T16 of the protection IC 113-(i−1) for a battery 111-$i$ arranged at a position of a subsequently higher potential. However, since it is unnecessary for the protection IC of this embodiment to perform level shifting or the like, the terminals T13 and T14 of a protection IC 113-$i$ may be connected to the terminals T15 and T16 of another protection IC 113-$j$, the terminals T13 and T14 of a protection IC of the first stage may be opened, and the terminals T15 and T16 of a protection IC of the last stage may be connected to the drive circuits 114 and 115, respectively. It is unnecessary to consider the potentials of batteries 111-$i$ and 111-$j$, which are being monitored. It should be noted that the protection IC 113-$j$ represents an arbitrary one of the protection ICs 113-1 through 113-$n$, other than the protection IC 113-$i$.

The present invention is not limited to the specifically disclosed embodiments, and variations and modifications may be made without departing from the scope of the present invention.

The present application is based on Japanese Priority Application No. 2004-134319 filed on Apr. 28, 2004, the entire contents of which are hereby incorporated by reference.

What is claimed is:

1. A battery protection device for protecting a battery from an abnormal state, the battery protection device comprising:
   a detector that detects an abnormal state of the battery and outputs an abnormality detection signal when the abnormal state is detected;
   an input terminal to which a first current signal is input from a first external device;
   a voltage converter that converts the first current signal input to the input terminal to a voltage signal;
   a combiner that combines the abnormality detection signal detected by the detector with the voltage signal output by the voltage converter and outputs a combined signal;
   a current converter that converts the combined signal to a second current signal; and
   an output terminal that outputs the second current signal to a second external device.

2. The battery protection device as claimed in claim 1, wherein the battery protection device is formed by a semiconductor integrated circuit chip.

3. A battery protection system for protecting a plurality of batteries connected in series from an abnormal state, the battery protection system comprising:
   a switching element connected to the batteries in series;

a plurality of battery protection devices which devices are provided for the batteries in a corresponding manner, detect an abnormal state of the corresponding batteries, and output an abnormality detection signal; and a drive circuit that drives the switching element in accordance with the abnormality detection signal, each of the battery protection devices including:

a detector that detects an abnormal state of a corresponding one of the batteries and outputs the abnormality detection signal when the abnormal state is detected;

an input terminal to which a first current signal is input from another one of the battery protection devices;

a voltage converter that converts the first current signal input to the input terminal to a voltage signal;

a combiner that combines the abnormality detection signal detected by the detector with the voltage signal output by the voltage converter and outputs a combined signal;

a current converter that converts the combined signal to a second current signal; and an output terminal that outputs the second current signal to a further one of the battery protection devices, wherein the battery protection devices are connected to each other such that the output terminal of one of the battery protection devices is connected to the input terminal of a subsequent one of the battery protection devices, and the output terminal of one of the battery protection devices of a last stage is connected to the drive circuit.

4. The battery protection system as claimed in claim 3, wherein each of the battery protection devices is formed by a semiconductor integrated circuit chip.

5. A battery protection method for protecting a plurality of batteries connected in series from an abnormal state, the battery protection method comprising the steps of:

providing battery protection circuits for the batteries in a corresponding manner, each of the battery protection circuits including:

a detector that detects an abnormal state of a corresponding one of the batteries and outputs an abnormality detection signal when the abnormal state is detected;

an input terminal to which a first current signal is input from another one of the battery protection devices;

a voltage converter that converts the first current signal input to the input terminal to a voltage signal;

a combiner that combines the abnormality detection signal detected by the detector with the voltage signal output by the voltage converter and outputs a combined signal;

a current converter that converts the combined signal to a second current signal; and an output terminal that outputs the second current signal to a further one of the battery protection devices, connecting the battery protection devices to each other such that the output terminal of one of the battery protection devices is connected to the input terminal of a sequential one of the battery protection devices; and controlling a switching element connected to the batteries in series in accordance with the current output from the output terminal of one of the battery protection devices of a last stage, thereby controlling the batteries.

* * * * *

UNITED STATES PATENT AND TRADEMARK OFFICE
CERTIFICATE OF CORRECTION

PATENT NO.       : 7,397,221 B2                                    Page 1 of 1
APPLICATION NO.  : 11/046492
DATED            : July 8, 2008
INVENTOR(S)      : Katsuya Sakuma et al.

It is certified that error appears in the above-identified patent and that said Letters Patent is hereby corrected as shown below:

Title page, Section (73) Assignee:  -  delete "Mitsemi Electric Co., Ltd." and insert --Mitsumi Electric Co., Ltd.--.

Signed and Sealed this

Fourth Day of November, 2008

JON W. DUDAS
*Director of the United States Patent and Trademark Office*